(12) United States Patent
Pape et al.

(10) Patent No.: US 12,326,819 B1
(45) Date of Patent: Jun. 10, 2025

(54) RENAMING CONTEXT IDENTIFIERS IN A PROCESSOR

(71) Applicant: Apple Inc., Cupertino, CA (US)

(72) Inventors: John D. Pape, Cedar Park, TX (US);
Madhu Sudan Har, Manor, TX (US);
Niket K. Choudhary, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/459,203

(22) Filed: Aug. 31, 2023

(51) Int. Cl.
*G06F 12/10* (2016.01)
*G06F 12/02* (2006.01)
*G06F 12/0891* (2016.01)
*G06F 12/1027* (2016.01)

(52) U.S. Cl.
CPC ...... *G06F 12/1027* (2013.01); *G06F 12/0292* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 6,604,187 B1 | 8/2003 | McGrath et al. | |
| 9,779,028 B1* | 10/2017 | Mukherjee | G06F 12/1027 |
| 2009/0113110 A1 | 4/2009 | Chen et al. | |
| 2011/0231630 A1* | 9/2011 | Dannowski | G06F 12/1036 |
| | | | 711/E12.065 |
| 2012/0215985 A1* | 8/2012 | Hunt | G06F 12/122 |
| | | | 711/E12.07 |
| 2014/0181388 A1 | 6/2014 | Mohandru et al. | |
| 2015/0134931 A1* | 5/2015 | Mukherjee | G06F 12/1027 |
| | | | 712/30 |
| 2018/0067866 A1 | 3/2018 | Shanbhogue et al. | |

(Continued)

FOREIGN PATENT DOCUMENTS

EP 3757859 B1 9/2022

OTHER PUBLICATIONS

Mageda Sharafeddine, et al., "Virtual Register Renaming" Electrical and Computer Engineering Department, American University of Beirut, Lebanon, Intel Corporation, Hillsboro, Oregon, USA, ARCS 2013, LNCS 7767, pp. 86-97, 2013.

(Continued)

*Primary Examiner* — Kevin Verbrugge
(74) *Attorney, Agent, or Firm* — Kowert, Hood, Munyon, Rankin & Goetzel, P.C.; Scott W. Page; Dean M. Munyon

(57) ABSTRACT

An apparatus includes a context identification circuit and a translation lookaside buffer (TLB) circuit. The context identification circuit may be configured to receive a context identifier assigned to a process being executed by a processor, and to assign a rename value to the context identifier that has fewer bits than the context identifier. The TLB circuit may be configured to receive a translation request for a virtual address that is associated with the process. The TLB circuit may be further configured to cache a translation of the virtual address to a corresponding physical address. The given entry may be tagged with a portion of the virtual address and the rename value. In response to a subsequent translation request for the virtual address, the TLB circuit may detect, using the portion of the virtual address and the rename value, a hit on the given entry of the TLB circuit.

20 Claims, 10 Drawing Sheets

(56) References Cited

U.S. PATENT DOCUMENTS

2018/0203807 A1 7/2018 Krueger
2019/0205261 A1 7/2019 Cheriton

OTHER PUBLICATIONS

Komal Jothi and Haitham Akkary, "Virtual Register Renaming: Energy Efficient Substrate forContinual Flow Pipelines," Department of Electrical and Computer Engineering, American University of Beirut, GLSVLSI'13, May 2-3, 2013, Paris, France, pp. 43-48.

* cited by examiner

*700*

```
┌─────────────────────────────────────────────────────────────┐
│ Generating, by a context identification circuit for a       │
│ context identifier associated with a process being executed │
│ by a processor, a rename value that has fewer bits than the │
│ context identifier.                                         │
│ 710                                                         │
└─────────────────────────────────────────────────────────────┘
                              │
                              ▼
┌─────────────────────────────────────────────────────────────┐
│ Receiving, by a translation lookaside buffer (TLB) circuit, │
│ a translation request for a particular virtual address that │
│ is associated with the process.                             │
│ 720                                                         │
└─────────────────────────────────────────────────────────────┘
                              │
                              ▼
┌─────────────────────────────────────────────────────────────┐
│ Accessing, by the TLB circuit using the particular virtual  │
│ address and the rename value, cached entries of the TLB     │
│ circuit.                                                    │
│ 730                                                         │
└─────────────────────────────────────────────────────────────┘
                              │
                              ▼
┌─────────────────────────────────────────────────────────────┐
│ In response to identifying a particular cached entry        │
│ associated with the particular virtual address and the      │
│ rename value, using a physical address translation stored   │
│ in the particular cached entry to complete the translation  │
│ request.                                                    │
│ 740                                                         │
└─────────────────────────────────────────────────────────────┘
```

```
┌─────────────────────────────────────────────────────────────────────┐
│ In response to determining that there are not a threshold number of │
│ available rename entries of a plurality of rename entries,          │
│ initiating an invalidation process.                                  │
│ 810                                                                  │
└─────────────────────────────────────────────────────────────────────┘
                                  │
                                  ▼
┌─────────────────────────────────────────────────────────────────────┐
│ Identifying a least-recently-used rename entry of the plurality of  │
│ rename entries.                                                      │
│ 820                                                                  │
└─────────────────────────────────────────────────────────────────────┘
                                  │
                                  ▼
┌─────────────────────────────────────────────────────────────────────┐
│ Using the least-recently-used rename value to identify cached       │
│ entries in the TLB circuit.                                          │
│ 830                                                                  │
└─────────────────────────────────────────────────────────────────────┘
                                  │
                                  ▼
┌─────────────────────────────────────────────────────────────────────┐
│ Invalidating the identified cached entries in the TLB circuit.       │
│ 840                                                                  │
└─────────────────────────────────────────────────────────────────────┘
```

FIG. 8

RENAMING CONTEXT IDENTIFIERS IN A PROCESSOR

BACKGROUND

Technical Field

Embodiments described herein are related to computing systems, including systems-on-a-chip (SoCs). More particularly, embodiments are disclosed to techniques for performing address translations in a computing system.

Description of the Related Art

Processors may use virtual-to-physical address mapping in order to, for example, support relocation of program code into available memory space. Applications, for example, may be written using virtual address references in order to support a wide variety of computing devices. For a given device, such applications may be stored in a first available portion of a nonvolatile memory space and then copied into and executed from a different portion of a volatile memory space. When the program code is stored or copied, a virtual-to-physical address mapping may be performed. When the program code is executed, virtual addresses referenced in the code are translated into the physical addresses corresponding to the portion of address space in which the program code and associated information are currently stored.

Multi-core processors and/or multi-threaded processor cores may be capable of having a plurality program threads active at a given point in time. The various combinations of processor and thread combinations are referred to herein as contexts. Various context identifiers are used in processors to identify the context for virtual addresses. For example, in some architectures, address-space identifiers (ASIDs) are identifiers assigned to applications, which identify their virtual address space separate from the virtual address space of other applications and/or an operating system. Typically, a translation lookup buffer (TLB) caches the ASID along with, or as part of, a tag from the virtual address to use for translation requests. Such a use of the ASID may allow for the TLB to distinguish translations requested by a first process from translations requested by a second process, thus allowing each process to utilize a same virtual address to access different physical addresses. As processors increase in performance capability, a number of bits used to define an ASID may increase, thereby increasing a size of a tag array of the TLB. In typical usage, only a few ASIDs may be active in the processor at a given time. Similarly, some processors may also implement virtualization via a plurality of virtual machines. In such cases, a virtual machine identifier (VMID) is assigned to a respective virtual machine to link to a particular virtual address space.

BRIEF DESCRIPTION OF THE DRAWINGS

The following detailed description makes reference to the accompanying drawings, which are now briefly described.

FIG. 7 illustrates flow diagram of an embodiment of a method for generating, by a context identification circuit, a rename value.

FIG. 8 shows a flow diagram of an embodiment of a method for invalidating, by a context identification circuit, a least-recently-used rename value.

Figure 1:
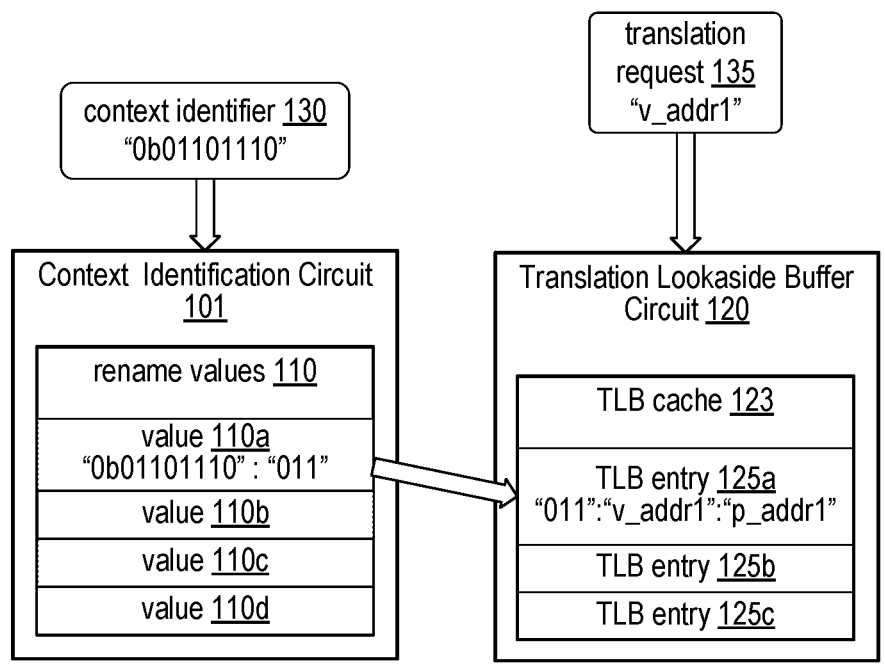
FIG. 1 illustrates a block diagram of an embodiment of an system that includes a context identification circuit and a translation lookaside buffer circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described above, some processor architectures support a virtual address space for a given active process. Accordingly, address translation may need to track which address spaces are associated with each active process. In addition, some processors also support implementation of a plurality of virtual machines. A given virtual machine may have a plurality of processes, each process with a respective virtual address space. Such processors may, therefore, track both virtual machine identifiers (VMIDs) and address space identifiers (ASIDs) to identify a particular address space for a particular process. These ASIDs and VMIDs are referred to herein as "context identifiers" as they provide a context for association with a particular process.

In some embodiments, context identifiers may include further information, such as identifying a particular type of context. For example, types may include "host" and "guest" types, indicative of an owner of a given translation. A host-type translation may indicate an address space owned by a host device, e.g., a device on which the processes are being executed. A guest-type translation may reference an address space that is initiated on behalf of a different device that is in communication with the host and may, therefore, be associated with a particular virtual machine with a particular VMID. In addition, a context identifier may include an indication that a particular type of translation is "global," thereby indicating that it may belong to multiple contexts. For example, a host-type translation that is marked global may be accessed by a plurality of host processes. A guest-type translation that is marked global may be accessed by any process with a VMID that matches the translation.

Use of such context identifiers may include establishing a tag based on the ASID and (if supported) VMID to identify a particular address space for an active process. These tags, however, grow in size as more information is included in them. In the ARM architecture, for example, ASIDs and VMIDs of eight or sixteen bits each can be supported. Accordingly, a translation lookaside buffer (TLB) may utilize a tag size of thirty-two bits per entry to identify both a virtual machine and address space corresponding to a particular process. Depending on how many different active processes are to be supported at a given time, tag storage to support all twenty-four bits may require a larger than desired circuit area for a given integrated circuit.

Techniques and apparatuses are proposed herein that reduce a size of TLB tag storage. For example, an apparatus is proposed that includes a context identification circuit and a TLB circuit. The context identification circuit may be configured to receive a context identifier assigned to a process being executed by a processor, and assign a rename value to the context identifier that has fewer bits than the context identifier. The TLB circuit may be coupled to the context identification circuit, and configured to receive a translation request for a particular virtual address that is associated with the process. The TLB circuit may be further configured to cache, in a given entry of the TLB circuit, a translation of the particular virtual address to a corresponding physical address. This given entry may be tagged with a portion of the particular virtual address and the rename value. In response to a subsequent translation request for the particular virtual address, the TLB circuit may detect, using both the portion of the particular virtual address and the rename value, a hit on the given entry of the TLB circuit. Using rename values that comprise fewer bits than a full context identifier may reduce a size of a tag storage used to access a TLB. This smaller storage size may save die area and/or reduce power consumption.

FIG. 1 illustrates a block diagram of an embodiment of a system that uses a context identification circuit to generate rename values for use with translation lookaside buffer (TLB) circuits. System 100 includes context identification circuit 101 and translation lookaside buffer (TLB) circuit 120. Context identification circuit 101 includes rename values 110, while TLB circuit 120 includes TLB cache 123. In some embodiments, system 100 may be a part of an integrated circuit, such as an SoC, which may further be included in a computing system, such as a desktop or laptop computer, a smartphone, a tablet computer, a wearable smart device, or the like.

As illustrated, system 100 includes context identification circuit 101 that is configured to receive context identifier 130 that is assigned to a process being executed by a processor (not shown). System 100 may include any suitable number of processor cores that are capable of executing program code such as software applications, operating systems, background processes and the like. A given program may include one or more processes and a given core may be capable of executing one or more programs concurrently. Any active process being executed by the included processor cores may generate one or more transaction requests, such as a memory read or write request. In the current embodiment, each process may be associated a particular virtual address space. Address spaces may be associated with, for example, each program that is currently active in the included processor cores. Context identifier 130 is provided to context identification circuit 101 as an indication of a particular active process. In some embodiments, context identifier 130 may include an address-space identifier (ASID) and/or a virtual machine identifier (VMID) to identify the particular active process. Context identification circuit 101 may be further configured to receive context identifier 130 in response to a change in a process being executed by the processor.

Context identification circuit 101 may, as shown, assign rename value 110a to context identifier 130, rename value 110a having fewer bits than context identifier 130. As illustrated, for example, context identifier 130 includes the eight-bit value "0b01101110." Rename value 110a assigns the three-bit value "011" to context identifier 130. The three-bit rename value 110a may be generated using any suitable technique. For example, a particular hash algorithm may be used such that any time context identifier 130 is received by context identification circuit 101, the same rename value 110a is assigned if available. A different hash algorithm may be utilized if the first rename value 110a is already in active use by a different process. In other embodiments, a rename value 110 may be selected (e.g., randomly or using a least-recently used technique) based on available ones of the three-bit rename values.

As shown, TLB circuit 120 is coupled to context identification circuit 101 and is configured to receive translation request 135 for a particular virtual address (v_addr1) that is associated with the process. While the process associated with context identifier 130, and subsequently rename value 110a, is active, one or more transaction requests may be generated. In some embodiments, transaction requests may be associated with data reads and writes generated in response to the execution of code included in the process. In some embodiments, transaction requests may be included in an instruction fetch or prefetch operation. Program code included in the process may use virtual addresses rather than explicit physical addresses for accessing memory locations in system 100. Such virtual addressing may allow the program code to be executed by a variety of hardware systems that may have different physical memory maps. The virtual addressing may also allow the program code to be executed with a variety of other programs without accessing similar addresses as the other programs.

System 100 may map the virtual addresses of active programs/processes into respective portions of the physical memory. When a particular virtual address of an active process is accessed for a first time, this virtual-to-physical address mapping is used to determine the corresponding physical address. As these virtual-to-physical address translation may take multiple cycles to resolve, TLB circuit 120 may be used to cache resolved address translations for subsequent translation requests for the same virtual address from the same process. TLB circuit 120 uses tags to identify a particular entry corresponding to a particular address translation that has been cached. As two or more different processes may use a same virtual address, identifying a particular process using the context identifier allows the proper address translation to be accessed. Accordingly, the tag for a given entry needs to be aware of the context of the process associated with a received translation request.

Context identification circuit 101 receives translation request 135 and determines the active process associated with translation request 135. Context identifier 130 associated with the active process is used to determine the assigned rename value 110a. Rename value 110a is sent to TLB circuit 120 along with translation request 135. If v_addr1 from translation request 135, in combination with rename value 110a, does not hit a valid TLB entry 125 in TLB circuit 120, then a translation operation is performed to determine a corresponding physical address (e.g., "p_addr1"). For example, a table-walk may be performed in a translation map table to identify a physical address (p_addr1) corresponding to the virtual address (v_addr1). In other embodiments, an exception may be generated to cause an operating system to handle the translation miss.

After the translation operation is performed, the resulting physical address (p_addr1) may be received by TLB circuit 120. After receiving physical address (p_addr1), TLB circuit 120 is further configured to cache, in a given entry (e.g., TLB entry 125a as shown) of TLB circuit 120, TLB entry 125a including the translation of the particular virtual address (v_addr1) to the corresponding physical address (p_addr1). TLB entry 125a may be tagged with all, or a portion, of the particular virtual address and rename value 110a.

In response to a subsequent translation request for v_addr1, context identification circuit 101 is further configured to use context identifier 130 (associated with subsequent translation request) to provide TLB circuit 120 with rename value 110a. TLB circuit 120 is further configured to receive rename value 110a along with the subsequent translation request, and detect, using both the v_addr1 and rename value 110a, a hit on TLB entry 125a of TLB circuit 120. For example, TLB circuit 120 may perform a hash of v_addr1, or simply use all or a portion of v_addr1 in combination with rename value 110a to access TLB entries 125 and identify TLB entry 125a. TLB circuit 120 may then return p_addr1 as the translation of v_addr1 for the process associated with the subsequent translation request.

By replacing context identifier 130 with rename value 110a, a tag for TLB entry 125a may be smaller than if the larger context identifier 130 were used in the tag. In turn, the tag storage in TLB circuit 120 may be smaller for a same number of TLB entries 125 in TLB cache 123. The smaller tag storage may use less die area and/or may consume less power when accessed.

It is noted that system 100, as illustrated in FIG. 1, is merely an example. System 100 has been simplified to highlight features relevant to this disclosure. Elements not used to describe the details of the disclosed concepts have been omitted. For example, system 100 may include various additional circuits that are not illustrated, such as one or more processor circuits, clock management circuits, communication buses, and the like. Although three-bit rename values and eight-bit context values are used as examples, any suitable number of bits may be used for either value, as long as the assigned rename value has fewer bits than the received context value.

In FIG. 1, a system for using a context identification circuit to generate a rename value for a context identifier is shown. Generation and use of rename values may be implemented using various techniques. An example of generating a new rename value and then subsequently using the new rename value is depicted in FIG. 2.

Figure 2:
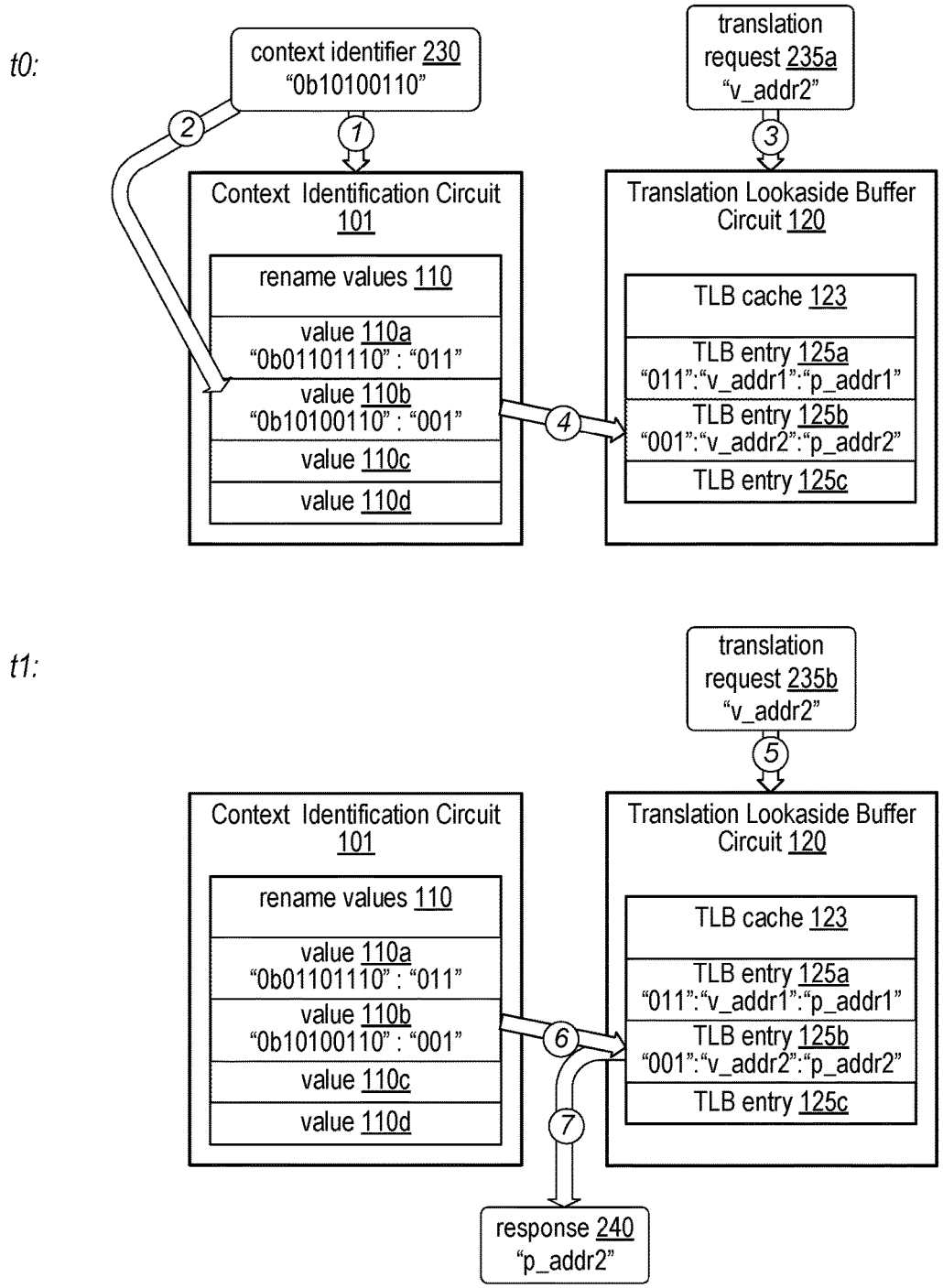
FIG. 2 shows a block diagram of an embodiment of the system of FIG. 1 at two points in time.

Moving to FIG. 2, system 100 of FIG. 1 is shown again, at two different points in time. At a first time (t0), context identification circuit 101 receives context identifier 230, indicative of a new process being executed. Subsequently, a first translation request 235a is received to translate virtual address v_addr2. At a subsequent time t1, a second translation request 235b is received, also requesting a translation of virtual address v_addr2.

As illustrated, context identification circuit 101 includes a plurality of rename entries, including rename values 110a-110d. At the beginning of time t0, context identification circuit 101 is in a state as shown in FIG. 1, with the entry of rename value 110a assigning the value of "011" to context identifier 130 ("0b1101110"). Other entries, including rename value 110b, may be unassigned at the beginning of time t0. Similarly, TLB circuit 120 has TLB entry 125a associated with rename value 110a with a translation of v_addr1 to p_addr1. Other entries, including TLB entry 125b, may be unassigned at the beginning of time t0.

Between times t0 and t1, context identifier 230 is received, with a context value of "0b10100110." Context identifier 230 may, in some embodiments, be received in response to a change in context by a processor circuit in system 100. Context identification circuit 101 is configured to use context identifier 230 to determine whether a valid rename entry has been assigned to context identifier 230. In response to a determination that no valid rename entry has been assigned to this context, context identification circuit 101 is further configured to assign rename value 110b to context identifier 230, with a rename value of "001."

Subsequent to the assignment of rename value 110b, translation request 235a is received, including a request to translate the virtual address v_addr2 to a corresponding physical address. Context identification circuit 101 associates context identifier 230 with translation request 235a. For example, context identifier 230 may be associated with a most recent activated context and, therefore, associated with translation request 230a by default. In other embodiments, context identification circuit 101 may receive, or have access to a value that indicates a current context. In some embodiments, translation request 235a may include, or be accompanied by an indication of the current context. Context identification circuit 101 is further configured to search, using context identifier 230, the plurality of rename values 110 for a valid corresponding rename value. In response to identifying rename value 110b as associated with context identifier 230, context identification circuit 101 is further configured to send rename value 110b to TLB circuit 120.

As illustrated, TLB circuit 120 uses rename value 110b and at least a portion of v_addr2 to index through TLB cache 123 to determine whether a valid TLB entry 125 is assigned to v_addr2 for the context represented by rename value 110b. At the time translation requests 235a is received, no TLB entry has been assigned to the combination of rename value 110b and v_addr2. Accordingly, TLB circuit 120 is configured to request a translation operation for v_addr2 and context identifier 230. TLB circuit is further configured to, in response to receiving the translation of v_addr2 to p_addr2, create an associated TLB entry, and selects TLB entry 125b to store the v_addr2 to p_addr2 translation, and associate TLB entry 125b with rename value 110b. It is noted that context identifier 230 (as well as other context identifiers) is not used within the TLB entries 125.

At a subsequent time t1, translation request 235b is received, including a request to translate v_addr2. As described above, context identification circuit 101 is configured to determine that translation request 230b is associated with context identifier 230. Context identification circuit 101 again provides rename value 110b to TLB circuit 120. TLB circuit 120, in turn, uses rename value 110b and at least a portion of v_addr2 to index into TLB cache 123, thereby identifying TLB entry 125b as having the translation of v_addr2 to p_addr2. TLB circuit 120 may then send response 240 in reply to translation request 230b.

It is noted that the example shown in FIG. 2 is one depiction of using a context identification circuit to generate and use rename values. Although only four entries are shown for rename values 110 and TLB cache 123, any suitable number of respective entries may be included in other embodiments, including a different number of rename values from the number of TLB entries.

In the descriptions of FIGS. 1 and 2, use of a single context identifier is illustrated. Context identifiers may be implemented in a variety of fashions. Additional details for implementing a context identifier for use by a context identification circuit is shown in FIG. 3.

Figure 3:
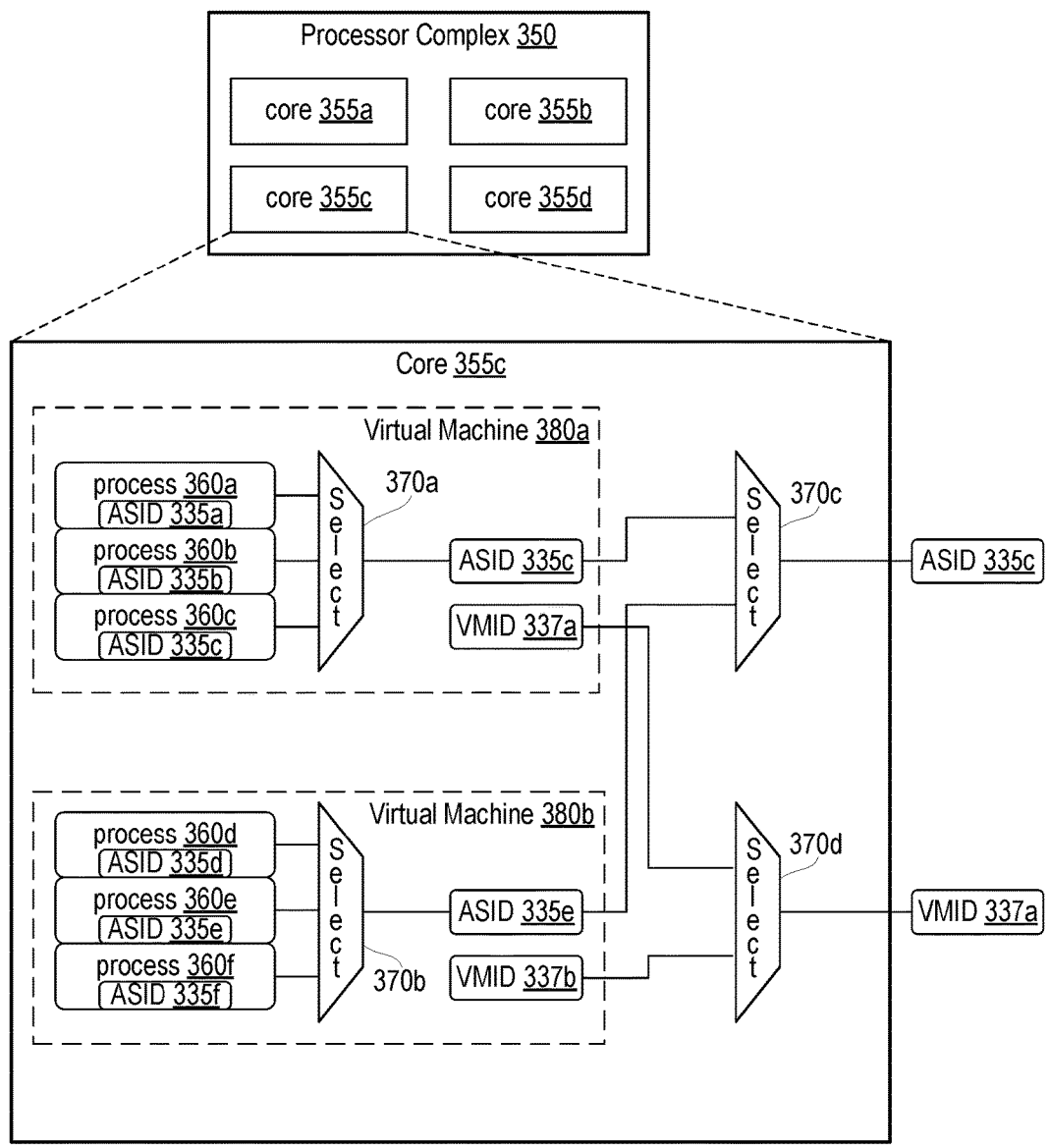
FIG. 3 depicts a block diagram of an embodiment of a system that includes a multicore processor complex.

Turning to FIG. 3, a block diagram of an embodiment of a system with a multicore processor complex that supports virtual machines with respective pluralities of address spaces is shown. Processor complex 350, as illustrated, includes four cores, 355a-355d (collectively 355). One core of processor complex 350, core 355c, is shown with additional detail, including two instances of virtual machines (380a and 380b, collectively 380), each of virtual machines 380 with three of active process 360a-360f (collectively 360). Core 355c further includes four selects 370-370d (collectively 370). Selects 370a and 370b determine a currently selected one of processes 360 for each of virtual machine 380. Selects 370c and 370d indicate which of the virtual machines 380 are currently active in core 355c. Each of selects 370 may be implemented using hardware, software/firmware (e.g., microcode), or a combination thereof.

As illustrated, processor complex 350 may be included in system 100 of FIGS. 1 and 2 as a processor that executes one or more programs. Processor complex 350 is configured to execute instructions for a plurality of processes across a plurality of virtual machines. Execution of these instructions may generate transactions that require a virtual address to be translated into a physical address. Each of cores 355 may execute a respective one or more processes in which different processes may be associated with different address spaces. Core 355c, for example, is shown with two virtual machines instantiated, each virtual machine executing three respective processes. Virtual machine 380a executes processes 360a-360c, while virtual machine 380b executes processes 360d-360f.

When a particular transaction is issued for a given one of processes 360, a context identifier is used to link the particular transaction to the corresponding process 360. As shown, each of processes 360 across both virtual machines has a respective address space identifier (e.g., one of ASIDs 335a-335f) indicating a particular address space associated with the corresponding process 360. In addition, each virtual machine 380 has a respective virtual machine identifier (VMIDs 337a and 337b) assigned. To link transactions to the respective processes 360, core 355c uses a combination of the VMID 337 of the virtual machine 380 and ASID 335 of the process 360. As shown, core 355c is currently performing an instruction associated with process 360c in virtual machine 380a. Accordingly, core 355c signals that ASID 335c and VMID 337a are currently in process. Any transaction issued by core 355c at this time is associated with process 360c and a combination of VMID 337a and ASID 335c may be used as a context identifier, such as context identifiers 130 and 230 in FIGS. 1 and 2, respectively.

It is noted that, in some embodiments, different processes 360 may use a same address space and therefore have a same ASID 335 value. Different virtual machines 380, however, generally have different VMID 337 values. It is also noted that, in some cases, only an ASID value may be used to identify context. For example, if the access is by a host process, then only an ASID value may be used for the translation request and the translation lookup may be limited to host-type translations only. If, however, the access is by a virtual machine, as shown, then both VMID and ASID values may be used for the translation request, and the translation request may be limited to virtual machine (e.g., guest) types of translations.

In various embodiments, system 300 a context identification circuit, such as context identification circuit 101 in FIGS. 1 and 2, may include a particular table of rename values for VMIDs 337 and a different table of rename values for ASIDs 335. In such an architecture, a single rename value may be sent to a TLB circuit to search for translations, the single rename value being generated by concatenating the ASID rename value with the VMID rename value. Such an architecture may allow ASID rename values to be reused for different values of VMID 337, thereby reducing a number of ASID rename values that may be required to support all active processes in processor complex 350.

In other embodiments, a single rename table may be used to assign a rename value to a particular concatenation of VMID and ASID values. Such an implementation may require more rename table entries as compared to maintaining separate rename tables for VMID and ASID, but may reduce overhead circuitry by maintaining a single table. In some embodiments, VMID may not change frequently, and therefore, only an ASID rename table may be maintained. Such an embodiment may require an overall smaller rename table as compared to the previous two implementations. When the VMID does change, however, then all entries in the rename table may need to be invalidated and repopulated base on program execution in the newly active virtual machine.

In the examples disclosed to this point, the context rename values have been described in relation to usage of a translation lookaside buffer (TLB). In some complex integrated circuits, including some systems-on-chip (SoCs), multiple TLBs may be used. For example, an embodiment of an SoC may include an ITLB for translating virtual addresses used to fetch program instructions, a DTLB for translating virtual addresses used to fetch data, an L2TLB used to fetch information that will be cached in a level 2 cache memory, and the like. In some embodiments, the techniques described herein may be used to implement a respective context identification circuit for two or more different ones of the multiple TLB circuits. In other embodiments, the techniques described herein may be used to implement a single context identification circuit for some or all of the different TLB circuits.

In addition to use with TLB circuits, context identification circuits may be implemented to generate rename values for other types of circuits. For example, some processors may support use of privileged or secure modes. A particular processor core, e.g., core 355a, may enter a secure mode as part of an operating system task that requires a higher level of resource access (e.g., for processing an exception, accessing a secure memory location, and the like). Activity linked to processes performed in a secure mode may need to be identified to gain access to restricted resources. Context renaming using a context identification circuit such as described above may allow the processor to utilize the reduced size of a rename value in place of a larger secure context identifier, thereby simplifying circuits associated with the secure mode. In such an embodiment, a same context identification circuit may be used to generate the secure mode rename values as the TLB rename values.

It is noted that the system depicted in FIG. 3 is merely an example to demonstrate the disclosed concepts. Although four cores 355 and two virtual machines 380 are illustrated, other embodiments, may include any suitable numbers of each. Each of virtual machines 380 are shown with three respective processes, but any suitable number of processes may be executed by each virtual machine.

In the description of FIG. 3, use of VMIDs and ASIDs is described for determining a context identifier. As disclosed, rename tables for use with VMIDs and ASIDs may be implemented in a variety of fashions. One example of a context identification circuit that supports use of VMIDs and ASIDs is depicted in FIG. 4.

Figure 4:
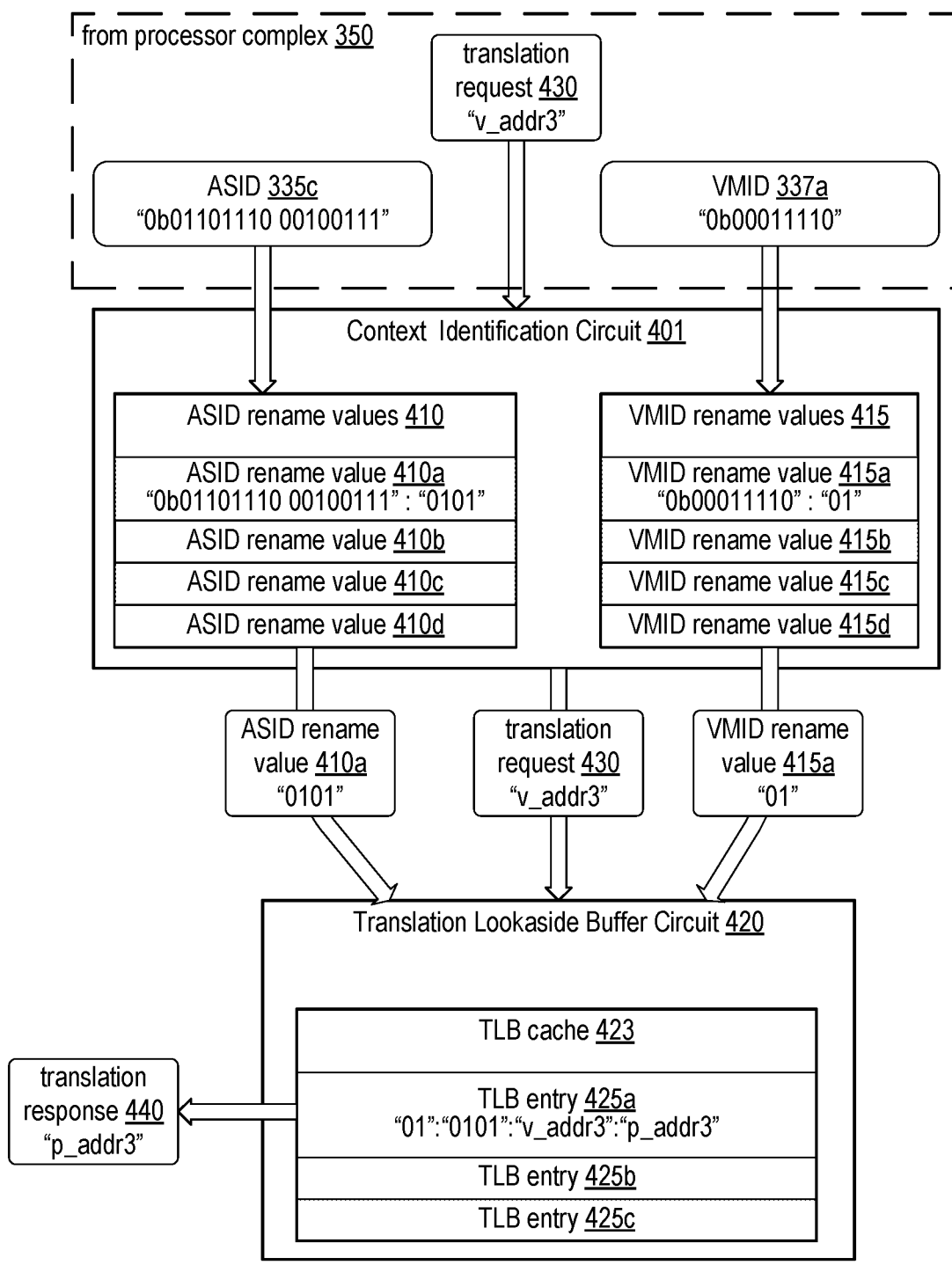
FIG. 4 illustrates a block diagram of an embodiment of a system with a context identification circuit that includes two tables of rename values.

Proceeding to FIG. 4, a block diagram of another embodiment of a system that uses a context identification circuit to generate rename values for use with TLB circuits is illustrated. System 400 includes processor complex 350 from FIG. 3 as well as context identification circuit 401, and translation lookaside buffer (TLB) circuit 420. Context identification circuit 401 includes two sets of rename values, ASID rename values 410 and VMID rename values 415, each shown with four entries. TLB circuit 420 includes translation lookaside buffer (TLB) cache 423 with three illustrated entries.

System 400 performs similar to system 100 of FIG. 1. As illustrated, context identification circuit 401 may, in response to receiving ASID 335c associated with a particular process being executed in processor complex 350, generate ASID rename value 410a that has fewer bits than ASID 335c. As depicted, ASID 335c is a sixteen-bit value. ASID rename value 410a is a four-bit value. In addition, context identification circuit 401 may, in response to receiving VMID 337a associated with the particular process, generate VMID rename value 415a that has fewer bits than VMID 337a. VMID 337a is an eight-bit value, while VMID rename value 415a is a two-bit value. ASID 335c and VMID 337a may be received in response to processor complex 350 switching to a different context during performance of one or more applications. For example, processor complex 350 may have been performing instructions related to an email application and switch contexts in response to receiving a text message in a different application running in the background.

Context identification circuit 401, as shown, includes a first set of locations and a second set of locations, corresponding to ASID rename values 410 and VMID rename values 415. These sets of locations may be implemented as memory locations, register circuits, or any other suitable type of data retaining circuits. For example, ASID rename values 410 and VMID rename values 415 may be implemented as separate tables in respective content-addressable memory circuits (CAMs), thereby allowing access to the two CAMs concurrently to retrieve an allocated ASID rename value and an allocated VMID rename value in parallel. In other embodiments, ASID rename values 410 and VMID rename values 415 may be implemented as one table in a common memory circuit, or as two separate tables in a common memory circuit. Various implementations are contemplated, including for example, RAM or register circuits that are accessed one or several entries at a time to search for a matching entry.

Context identification circuit 401 stores ASID rename value 410a (e.g., "0101") in an available one of the first set of locations in ASID rename values 410, and stores VMID rename value 415a (e.g., "01") in an available one of the second set of locations in VMID rename values 415.

As shown, context identification circuit 401 is further configured to receive translation request 430 for a particular virtual address ("v_addr3") that is associated with the particular process being executed in processor complex 350. In some embodiments, context identification circuit 401 may extract ASID 335c and VMID 337a from translation request 430. In other embodiments, context identification circuit 401 may track the last ASID and VMID values received from processor complex 350 (e.g., ASID 335c and VMID 337a). Context identification circuit 401 may then use ASID 335c to identify ASID rename value 410a in ASID rename values 410, and use VMID 337a to identify VMID rename value 415a in VMID rename values 415. Context identification circuit 401, as shown, sends ASID rename value 410a and VMID rename value 415a to TLB circuit 420. In various embodiments, TLB circuit 420 is configured to receive translation request 430, including "v_addr3," from context identification circuit 401, from processor complex 350, or from another circuit in system 400.

As illustrated, TLB circuit 420 is further configured to access, using the particular virtual address, ASID rename value 410a, and VMID rename value 415a, cached entries in TLB cache 423. In response to a determination that a single cached entry in TLB circuit 420 is not associated with v_addr3, ASID rename value 410a, and VMID rename value 415a, TLB circuit 420 may cache, in an available entry of TLB cache 423 (e.g., TLB entry 425a), a translation of v_addr3 to a corresponding physical address ("p_addr3"). TLB entry 425a may be tagged with ASID rename value 410a and VMID rename value 415a. ASID rename value 410a and VMID rename value 415a may be used in place of using the full context identifier, including ASID 335c and VMID 337a, thereby reducing a number of bits in the context identifier from twenty-four (sixteen bits of ASID 335c and eight bits of VMID 337a) to six bits (four bits of ASID rename value 410a and two bits of VMID rename value 415a). Such a reduction in the size of tags of TLB entries 425a-425c may reduce a physical size and/or power consumption of TLB cache 423. The more entries included in TLB cache 423, the greater the potential power and/or size reductions.

In other cases (e.g., TLB entry 425a exist when translation request 430 is received), TLB circuit 420 may determine that TLB entry 425a in TLB cache 423 is associated with v_addr3, ASID rename value 410a, and VMID rename value 415a. In response to this determination, TLB circuit 420 may use a physical address translation stored in TLB entry 425a to complete translation request 430. For example, TLB circuit 420 may send (or cause to be sent) translation response 440 to processor complex 350 indicating that the translation of virtual address "v_addr3" is physical address "p_addr3."

It is noted that the example of FIG. 4 is merely an example. In other embodiments, a context identification circuit may include a different number of sets of locations. For example, as disclosed in regards to FIG. 3, a secure context identifier may be included in the context identifier, a third set of locations may be included to store secure context rename values in addition to ASID and VMID rename values. Although four entries are shown for ASID rename values 410 and VMID rename values 415, and three entries are shown for TLB cache 423, any suitable number of entries may be used for any or all of these storage circuits. It is further noted that, in some embodiments, the number of ASID rename values may not be the same as the number of VMID rename values.

Figure 5:
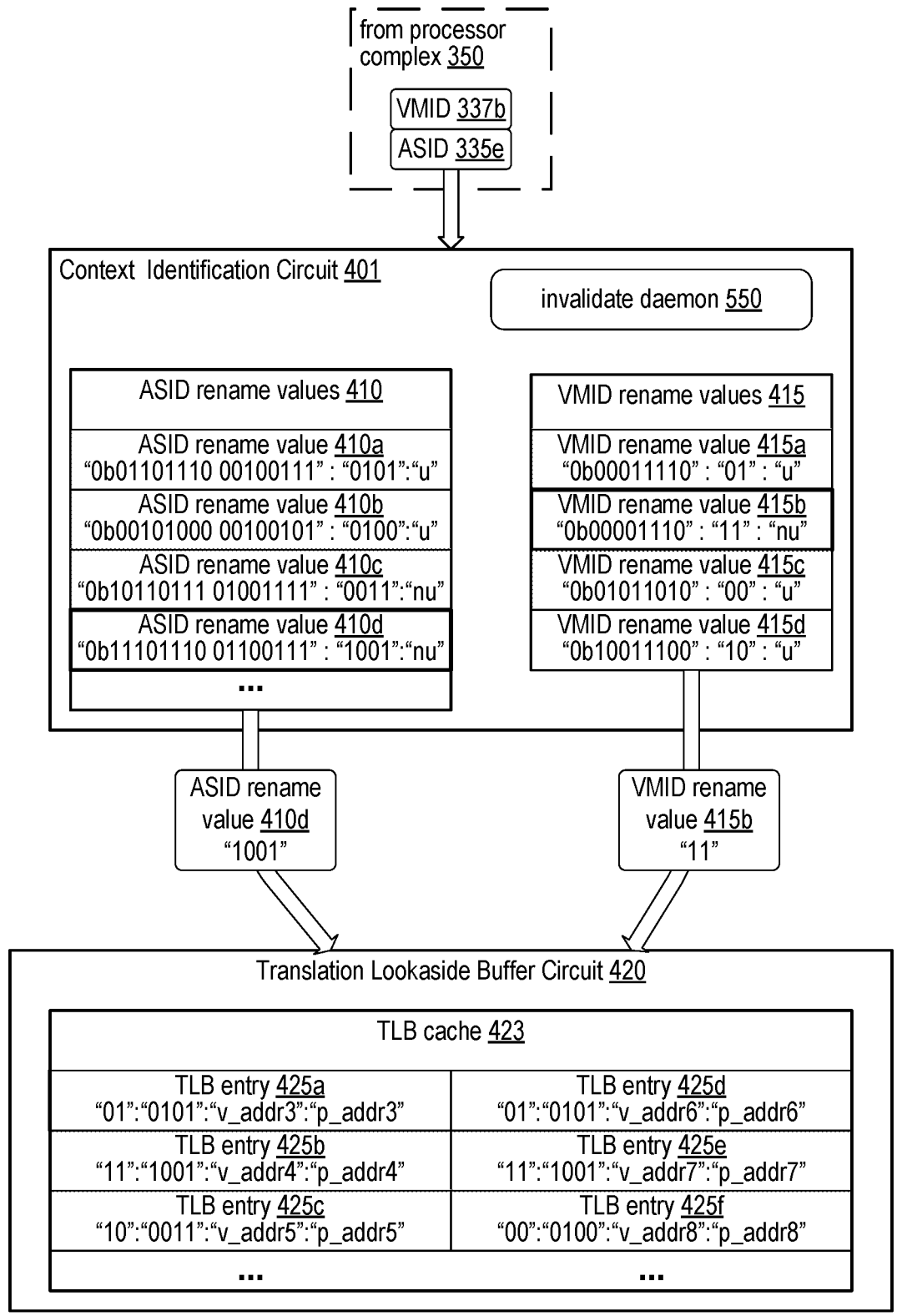
FIG. 5 shows a block diagram of an embodiment of the system of claim 4 in which the context identification circuit includes an invalidate daemon.

In FIG. 4, generation and use of ASID and VMID rename values by a context identification circuit are disclosed. As a number of entries is limited for storing these rename values, entries may need to be evicted to make entries available for newly received context identifiers. FIG. 5 depicts such a scenario.

Moving now to FIG. 5, a block diagram of another embodiment of a system that that evicts rename value entries from a context identification circuit is shown. System 500 includes context identification circuit 401 and TLB circuit 420 from FIG. 4. TLB cache 423 in TLB circuit 420 is shown with three additional TLB entries, 425*d*-425*f*. Context identification circuit 401 is shown to include invalidate daemon 550 that may evict rename value entries from ASID rename values 410 and VMID rename values 415 based on particular conditions. As used herein, a "daemon" is a background process that remains alert to perform a particular function periodically and/or under particular conditions or triggers. Although shown within context identification circuit 401, invalidate daemon 550 may be performed by a processor circuit within system 500, such as one of cores 355 in processor complex 350 of FIG. 3.

As described above, context identification circuit 401 includes ASID rename values 410 and VMID rename values 415, each shown with four entries, although any suitable number of entries may be included in other embodiments. As depicted in FIG. 5, all four entries of ASID rename values 410 and all four entries of VMID rename values 415 are currently populated.

As illustrated, in response to receiving a different context identifier, context identification circuit 401 may identify an available one of the plurality of ASID rename values 410 and/or VMID rename values 415. In response to a determination that there are no available entries in ASID rename values 410 and/or VMID rename values 415, context identification circuit 401 may invalidate a selected one of the plurality of rename entries. For example, context identification circuit 401 receives an indication from processor complex 350 that context has changed from a process identified by VMID 337*a* and ASID 335*c* (as shown in FIG. 4) to a process identified by VMID 337*b* and ASID 335*e*. Since all entries in ASID rename values 410 and VMID rename values 415 have been allocated, context identification circuit 401 identifies an entry in each of ASID rename values 410 and VMID rename values 415 and invalidates each of the selected entries. After the selected entries are invalidated, the corresponding VMID and ASID rename values may be allocated to VMID 337*b* and ASID 335*e*, respectively. It is noted that, if the context change was identified with VMID 337*a* rather than 337*b* (e.g., there was no change in VMID as a result of the context change), then only an entry in ASID rename values 410 may be selected and invalidated.

To invalidate the selected rename entries, context identification circuit 401 is further configured to identify a least-recently-used entry in each of ASID rename values 410 and VMID rename values 415. For example, context identification circuit 401 may track when a translation request received from processor complex 350 hits on a given one of VMID rename values 415 and ASID rename values 410. As shown, the entries in ASID rename values 410 and VMID rename values 415 include a usage flag that is illustrated with either "u" or "nu." ASID rename values 410*a* and 410*b*, and VMID rename values 415*a*, 415*c*, and 415*d* include a "u" flag to indicate that they have been used, while ASID rename values 410*c* and 410*d*, and VMID rename value 415*b* are marked with "nu" to indicate these entries have not been used. The entries may use any suitable values to indicate used and not used, including e.g., a single bit set to "0" for unused and "1" for used.

In some embodiments, the usage flag may be reset after an eviction occurs. If only an ASID entry is evicted, then only the usage flags for ASID rename values 410 may be reset to the "nu" state. If both ASID and VMID entries are evicted, then all usage flags in ASID rename values 410 and VMID rename values 415 may be reset to the "nu" state. Resetting the usage flags after an eviction may enable the usage flags to indicate recent usage, and avoid "stale" flags that were set in response to usage that occurred many accesses in the past.

If more than one entry is flagged as unused, then context identification circuit 401 may use any suitable technique to select one entry from the one or more candidate entries. For example, a least-recently evicted entry may be tracked, a round-robin selection may be used, random candidate may be selected, and the like. In some embodiments, if a particular VMID entry is being evicted, then an ASID entry associated with that VMID entry will be selected. For example, as shown, VMID rename value 415*b* from the VMID entries is selected. Both ASID rename values 410*c* and 410*d* from the ASID rename values 410 are indicated as unused. ASID rename value 410*c*, however, is associated with VMID rename value 415*d*, as indicated by TLB entry 425*c* that is tagged with these two rename values. Accordingly, ASID rename value 410*d* may be selected as it is associated with the selected VMID rename value 415*b* (as shown, e.g., in TLB entries 425*b* and 425*e*).

After a candidate entry is selected, context identification circuit 401 is further configured to use the corresponding rename value from the selected entries to identify ones of TLB entries 425 in TLB cache 423, and invalidate the identified TLB entries 425. For example, context identification circuit sends ASID rename value 410*d* and VMID rename value 415*b* to TLB circuit 420. TLB entries 425 that correspond to VMID rename value 415*b* and/or ASID rename value 410*d* may then be evicted from TLB cache 423. As shown, TLB entries 425*b* and 425*e* are tagged with VMID rename value 415*b* and ASID rename value 410*d*. Since these two rename values are being evicted and will be reallocated to different context identifiers, the tags for TLB entries 425*b* and 425*e* will be reassigned and the translations in these TLB entries will be invalid for the new context.

After TLB entries 425*b* and 425*e* have been evicted, then the selected ASID rename value 410*d* and VMID rename value 415*b* may be evicted and reallocated. The selected rename values may not be reallocated until associated TLB entries 425 are evicted in order to ensure that no TLB entry 425 is tagged with an invalid rename value. It is noted that, while this invalidation operation is active, context identification circuit 401 may stall reception of further context changes and translation requests. This may allow resources to be used for completing the invalidation operation and properly processing the received VMID 337*b* and ASID 335*e* to allocate the rename values before processing any subsequent requests.

In cases in which both VMID and ASID rename entries are being evicted, context identification circuit 401 may send VMID rename value 415*b* to TLB circuit 420 before sending ASID rename value 410*d*. All TLB entries 425 that are tagged with VMID rename value 415*b* may then be evicted from TLB cache 423. In some embodiments, if ASID rename value 410*d* is only associated with VMID rename value 415*b*, then context identification circuit 401 may not need to send ASID rename value 410*d* to TLB circuit 420 since the corresponding TLB entries 425 will have already been evicted based on VMID rename value 415*b*.

In addition to, or instead of, evicting rename entries in response to an indication of a context change, context identification circuit 401 may be further configured to determine whether a threshold number of ASID rename values 410 and/or VMID rename values 415 are available. In some embodiments, for example, thresholds may be set to 80% or 90% allocated. In response to a determination that there are not a threshold number of available rename entries, context identification circuit 401 may invalidate a selected one or more of ASID rename values 410 and VMID rename values 415. In some embodiments, the thresholds may be different for ASID entries than for VMID entries. For example, VMID context changes may occur more rarely than ASID context changes. Accordingly, the threshold for ASID rename values 410 may be set lower (e.g., 70% allocated) than the threshold for VMID rename values 415 (e.g., 85% allocated). The lower threshold may keep more entries in ASID rename values 410 available for use since a context change is more likely to result in a new ASID identifier.

As illustrated, context identification circuit 401 may be further configured to use invalidate daemon 550 to invalidate the selected one or more of ASID rename values 410 and VMID rename values 415. Invalidate daemon 550 may perform the invalidation operations as described above, including identifying suitable ones of ASID rename values 410 and VMID rename values 415 to evict and further evicting (or causing to be evicted) TLB entries 425 that are tagged with the selected ASID rename values 410 and VMID rename values 415.

In some embodiments, invalidate daemon 550 may, to identify suitable rename entries for eviction, determine whether ones of ASID rename values 410 and VMID rename values 415 are currently being used by one or more TLB entries 425 in TLB cache 423. For example, invalidate daemon 550 may, in response to determining that a threshold number of entries in ASID rename values 410 and/or VMID rename values 415 are currently allocated, clear all of the usage flags in the rename entries. Invalidate daemon 550 may then scan the tags of TLB entries 425 in TLB cache 423 for the associated ASID rename values 410 and VMID rename values 415. For each TLB entry 425, the associated ASID and VMID rename values used in the TLB entry tag are identified and the usage tags for those ASID and VMID rename values are set to "u." After all TLB entries 425 have been scanned, ASID rename values 410 and VMID rename values 415 that remain with usage flags set to "nu" are identified and some, or all, of these identified rename values may be evicted.

While invalidate daemon 550 is performing invalidation operations, context identification circuit 401 may continue to process a newly received context identifier or translation request concurrently with invalidate daemon 550. For example, context identification circuit 401 may be further configured to receive, while invalidating the ASID rename value 410d and VMID rename value 415b, a new translation request for a given process corresponding to ASID rename value 410d and VMID rename value 415b. Context identification circuit 401 may continue to invalidate ASID rename value 410d and VMID rename value 415b despite the new translation request. In some embodiments, processing of the new translation request may be stalled to allow the eviction of ASID rename value 410d and VMID rename value 415b to continue until complete. Processing of the new translation request may then proceed and be processed as a miss in TLB circuit 420.

Use of invalidate daemon 550 may reduce stall time when invalidating rename entries, as compared to waiting until no entries in ASID rename values 410 and VMID rename values 415 are available. Running a daemon in the background may utilize time when context identification circuit 401 has more bandwidth, and may keep a larger number of entries in ASID rename values 410 and VMID rename values 415 available. Keeping a larger number of entries available may, however, reduce efficient use of the available entries and, in some embodiments, may result in more entries being included in ASID rename values 410 and/or VMID rename values 415 than if entries are invalidated after all have been allocated.

In some embodiments, an invalidation request may come from one of cores 355 in processor complex 350 in response to an application or other software being executed by one of cores 355. For example, a particular process included in an application may end and, to clean-up memory usage, the application may execute a translation lookaside buffer invalidation (TLBI) instruction directed to a particular ASID and/or VMID associated with particular process. For example, the ARM instruction set architecture includes a TLB Invalidate instruction that may be used for such purposes.

In response to execution of a TLBI instruction, context identification circuit 401 may receive an ASID and/or VMID associated with the TLBI instruction, and provide TLB circuit 420 with the corresponding VMID rename value 415 and/or ASID rename value 410 in order to perform an invalidation operation as described above. If, however, a corresponding VMID and/or ASID entry is not found in context identification circuit 401, then the invalidation operation may be skipped since the lack of a corresponding VMID and/or ASID entry may indicate that no TLB entries 425 currently exists for the ASID and/or VMID associated with the TLBI instruction. For example, the TLB entries associated with the TLBI instruction may have been previously invalidated to free an ASID and/or VMID entry in context identification circuit 401 such as described above. Accordingly, use of context identification circuit 401 with TLBI instructions may save time and power by indicating that no associated TLB entries 425 currently exist without TLB circuit 420 having to search through TLB cache 423.

It is noted that the system depicted in FIG. 5 is merely an example for describing the disclosed techniques. In other embodiments, a different number of entries may be included in TLB cache 423, ASID rename values 410, and/or VMID rename values 415. In various embodiments, invalidate daemon 550 may be implemented as software, firmware, hardware, or a combination thereof.

Figure 6:
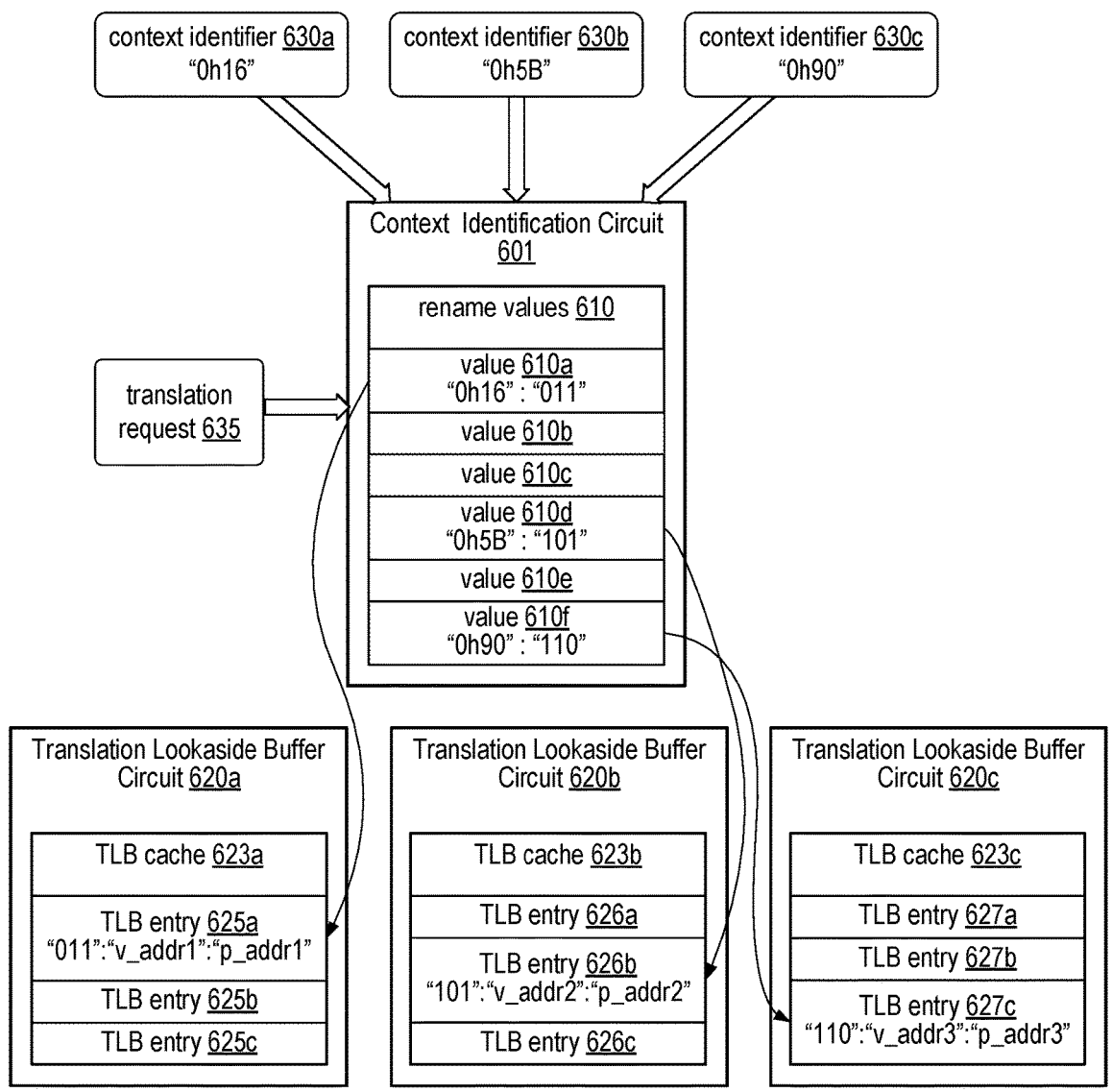
FIG. 6 depicts an embodiment of a system that includes a context identification circuit and a plurality of translation lookaside buffer circuits.

In the embodiments disclosed above, a context identification circuit has been depicted as providing rename values for a single translation lookaside buffer circuit. In other embodiments, however, the disclosed techniques may be applied to a context identification circuit that provides rename values for a plurality of translation lookaside buffer circuits, a plurality of secure mode contexts, and/or a combination thereof. FIG. 6 depicts a system with multiple translation lookaside buffer circuits.

Proceeding now to FIG. 6, an embodiment of a system in which a context identification circuit is used to support rename values for three translation lookaside buffer circuits is illustrated. System 600 includes context identification circuit 601 and translation lookaside buffer (TLB) circuits 620a-620c (collectively 620). Context identification circuit 601 is shown maintaining a single one of rename value 610 for respective context identifiers 630a-630c (collectively 630), in other embodiments, context identification circuit 601 may track context identifiers that include multiple values, such as ASID and VMID values.

In some embodiments, TLB circuits 620 may be a similar type of TLB circuit for different ones of a plurality of processing circuits. For example, each of TLB circuits 620 may be a data address TLB circuit for respective ones of cores 355a-355c in FIG. 3. In other embodiments, TLB circuits 620 may be different types of TLB circuits, all associated with a common processing circuit or common set of processing circuits. For example, TLB circuit 620a may be for data cache addresses, TLB circuit 620b may be for instruction cache addresses, and TLB circuit 620c may be for level 2 (L2) cache addresses. In such an embodiment, all three TLB circuits 620 may support cores 355 in processor complex 350.

As illustrated, context identification circuit 601 receives context identifiers 630, that are indications of a context change of a respective processing circuit. In various embodiments, context identifiers 630 may be received concurrently, serially, or a combination thereof. For example, cores 355 in FIG. 3 may each change context at any given time, including two or more changing context in an overlapping manner. In some embodiments, context identification circuit 601 may include a queue (e.g., a first-in-first-out queue) for receiving and storing context identifiers 630 until context identification circuit 601 has available bandwidth, as well as an available entry in rename values 610, to process the indicated context change. In the illustrated example, context identification circuit 601 is configured to allocate value 610a ("011") to context identifier 630a ("0h16"), allocate value 610d ("101") to context identifier 630b ("0h5B"), and allocate value 610f ("110") to context identifier 630c ("0h90"). These rename values may be used to tag TLB entries in TLB caches 623a-623c.

For example, translation request 635 may be received by context identification circuit 601 after context identifiers 630 have been allocated their respective rename values. In a first case, translation request 635 may be received from core 355a and include a request for a translation of a data cache virtual address (e.g., "v_addr1"). In response, context identification circuit 601 determines that value 610a is allocated to the current context of core 355a and sends value 610a to TLB circuit 620a to translate v_addr1 to p_addr1 as shown in TLB entry 625a. In a second case, translation request 635 may be received from core 355b and include a request for a translation of an instruction cache virtual address (e.g., "v_addr2"). In this case, context identification circuit 601 determines that value 610d is allocated to the current context of core 355b and sends value 610d to TLB circuit 620b to translate v_addr2 to p_addr2 as shown in TLB entry 626b. In a third example, translation request 635 may be received from core 355c and include a request for a translation of a L2 cache virtual address (e.g., "v_addr3"). Context identification circuit 601, in this case, determines that value 610f is allocated to the current context of core 355c and sends value 610f to TLB circuit 620c to translate v_addr3 to p_addr3 as shown in TLB entry 627c.

Using a single table, such as rename values 610, to manage rename allocation for a plurality of different TLB circuits may reduce a size of memory circuits for maintaining the necessary rename entries as compared to having a separate rename table for each TLB circuit 620. Such a single table approach, however, may increase complexity for maintaining the table of rename values 610, which in turn, may result in increased size of control logic and/or increase a latency for allocating and invalidating rename entries. Accordingly, in some embodiments, context identification circuit 601 may include a separate set of rename tables for each of TLB circuits 620.

It is noted that the system of FIG. 6 is merely an example. Although a single table of rename values 610 is shown in context identification circuit 601, any suitable number of tables may be used. Although three TLB circuits are illustrated as being supported by context identification circuit 601, any suitable number of TLB circuits may be included.

To summarize, various embodiments of an apparatus may include a context identification circuit and a translation lookaside buffer (TLB) circuit. The context identification circuit may be configured to receive a context identifier assigned to a process being executed by a processor, and to assign a rename value to the context identifier that has fewer bits than the context identifier. The TLB circuit may be coupled to the context identification circuit, and configured to receive a translation request for a particular virtual address that is associated with the process. The TLB circuit may be further configured to cache, in a given entry, a translation of the particular virtual address to a corresponding physical address. The given entry may be tagged with a portion of the particular virtual address and the rename value. In response to a subsequent translation request for the particular virtual address, the TLB circuit may detect, using both the portion of the particular virtual address and the rename value, a hit on the given entry of the TLB circuit.

In a further example, the context identification circuit may be further configured to, in response to the subsequent translation request for the particular virtual address, use the particular virtual address to provide the TLB circuit with the rename value. In an example, the context identification circuit may be further configured to receive a given context identifier in response to a change in a process being executed by the processor.

In another example, the context identification circuit may include a plurality of rename entries. The context identification circuit may be further configured to, in response to receiving a different context identifier, identify an available one of the plurality of rename entries. In response to a determination that there are no available rename entries, the context identification circuit may be further configured to invalidate a selected one of the plurality of rename entries.

In an example, to invalidate the selected rename entry, the context identification circuit may be further configured to identify a least-recently-used rename entry, and to use a corresponding rename value from the least-recently-used rename entry to identify cached entries in the TLB circuit. The context identification circuit may be further configured to invalidate the identified cached entries in the TLB circuit.

In another example, the context identification circuit may include a plurality of rename entries, and may be further configured to determine whether a threshold number of the plurality of rename entries are available. In response to a determination that there are not a threshold number of available rename entries, the context identification circuit may be configured to invalidate a selected one or more of the plurality of rename entries.

In a further example, the context identification circuit may be further configured to use a daemon to invalidate the selected one or more of the plurality of rename entries, and to process a given received context identifier concurrently with the background process. In a subsequent example, the context identification circuit may be further configured to receive, while invalidating the selected rename entry, a translation request for a given process corresponding to the selected rename entry, and to continue to invalidate the selected rename entry.

In an example, the context identification circuit may include a plurality of rename entries. The context identification circuit may be further configured to search, using a context identifier included in the subsequent translation request, the plurality of rename entries for the rename value, and to use the rename value and the portion of the particular virtual address as an index into the TLB circuit.

The circuits and techniques described above in regards to FIGS. 1-6 may be performed using a variety of methods. Two methods associated with operation of a system that includes a context identification circuit and a TLB circuit are described below in regards to FIGS. 7 and 8.

Turning now to FIG. 7, a flow diagram for an embodiment of a method for using a rename value provided by a context identification circuit to access a translation lookaside buffer is illustrated. Method 700 may be used in conjunction with any of the computer circuitry, systems, devices, elements, or components disclosed herein, such as systems 100-600 in FIGS. 1-6. In some embodiments, some or all of the operations of method 700 may be performed using instructions included in a non-transitory, computer-readable storage medium having program, the instructions being executable by a processing circuit in systems 100-600 (e.g., processor complex 350 in FIG. 3) to cause the operations described with reference to FIG. 7. Method 700 is described below using system 100 of FIG. 1 as an example. References to elements in FIG. 1 are included as non-limiting examples.

As illustrated, method 700 begins in block 710 by generating, for a particular context identifier associated with a particular process being executed by a processor, a particular rename value that has fewer bits than the particular context identifier. Context identification circuit 101, for example, may receive context identifier 130 from the processing circuit and generate rename value 110a as a rename value for context identifier 130 that identifies the particular process. The particular process, therefore, may be identified using the three-bit rename value 110a ("011") rather than the eight-bit context identifier 130 ("0b01101110"). Context identification circuit 101 may further store the particular rename value "011" in a particular one of a plurality of locations in a table of rename values 110.

Method 700 continues at block 720 by receiving a translation request for a particular virtual address that is associated with the particular process. For example, translation lookaside buffer (TLB) circuit 120 may receive translation request 135 to translate the virtual address "v_addr1." TLB circuit 120 may receive translation request from the processor, from context identification circuit 101, or another circuit in system 100 that isn't illustrated. Translation request 135 is associated with the particular process being executed by the processor. In response to also receiving translation request 135 for v_addr1, context identification circuit 101 may use information from translation request 135 to identify the particular location in the table of rename values 110. In response to determining that rename value 110a corresponds to the particular process associated with translation request 135, context identification circuit 101 may send rename value 110a to TLB circuit 120.

At block 730, method 700 continues by accessing, using the particular virtual address and the particular rename value, cached entries of the TLB circuit. TLB circuit, for example, extracts v_addr1 from translation request 135 and receives rename value 110a from context identification circuit 101. TLB circuit 120 may use these two values to scan TLB cache 123 to determine if any of TLB entries 125 correspond to translation request 135.

Method 700 further continues at block 740 by, in response to identifying a particular cached entry associated with the particular virtual address and the particular rename value, using a corresponding physical address translation stored in the particular cached entry to complete the translation request. If one of TLB entries 125 corresponds to v_addr1 and value 110a, then v_addr1 has previously been translated and the corresponding physical address of "p_addr1" may be returned to the requesting process. Otherwise, if the scan of TLB cache 123 is a miss, then translation request 135 may be translated by other circuits and the result of this translation stored in a corresponding TLB entry 125, using p_addr1 and value 110a to generate a tag for the corresponding TLB entry 125.

By using a rename value with fewer bits than a corresponding context identifier, tags for TLB cache entries may shorter, thereby reducing an amount of memory circuitry for storing these tags. Although only three TLB entries are shown, some embodiments may have tens, hundreds, or thousands of entries, such that any additional circuitry for adding the functionality of the disclosed context identification circuit is more than compensating by the reduction in tag memory circuitry.

It is noted that the method of FIG. 7 includes blocks 710-740. Method 700 may end in block 740 or may repeat some or all blocks of the method. For example, method 700 may return to block 710 in response to an indication of a different process being executed by the processor, generating a different rename value, and storing the different rename value in a different one of the plurality of locations in the table of rename values 110. In some cases, blocks of method 700, or a portion thereof, may be performed concurrently with other blocks of the method. For example, blocks 710 and/or 720 may be performed while blocks 730 and or 740 are being performed.

Proceeding now to FIG. 8, a flow diagram for an embodiment of a method for performing a store-to-load forwarding operation by a hierarchal store queue circuit is illustrated. Similar to method 700, method 800 may be used in conjunction with any of the computer circuitry, systems, devices, elements, or components disclosed herein, such as systems 100-600. Some or all of the operations of method 800, in some embodiments, may be performed using instructions included in a non-transitory, computer-readable storage medium having program, the instructions being executable by a processing circuit in systems 100-600 to cause the operations described with reference to FIG. 8. Method 800 is described below using FIG. 5 as an example embodiment. References to elements in FIG. 5 are included as non-limiting examples.

As shown, method 800 begins in block 810 by, in response to determining that there are not a threshold number of available rename entries of a plurality of rename entries, initiating an invalidation process. For example, invalidate daemon 550 may run in the background while context identification circuit 401 is active. Invalidate daemon 550 may track numbers of allocated entries in a table of ASID rename values 410 and a table of VMID rename values 415. Invalidate daemon 550 may be configured to compare the tracked number of allocated entries in each table to respective threshold values. If the number of allocated entries in either table satisfies the threshold, then method 800 may move to block 820 to perform an invalidation operation. In other embodiments, an invalidation daemon may not be used. Instead, context identification circuit 401 may trigger an invalidation operation in response to receiving a new indication of a context change and determining that there is not an available entry in ASID rename values 410 and/or VMID rename values 415.

At block 820, method 800 continues by identifying a least-recently-used rename entry of the plurality of rename entries. Context identification circuit 401 may, for example, mark the allocated entries with a usage flag. When an invalidation operation is triggered, the usage flags are cleared to indicate an "unused" state. When a given entry in ASID rename values 410 and/or VMID rename values 415 is hit in response to a received translation request, then the corresponding usage flag is set to indicate a "used" state. In some embodiments, invalidate daemon 550 may scan through valid TLB entries 425 to identify rename values that are currently being used as tags. In such embodiments, invalidate daemon 550 may set the corresponding usage flag to "used" for any rename values identified. When triggered, invalidate daemon 550 may use the usage flags to identify one or more ASID and/or VMID rename value entries that are flagged as unused. Invalidate daemon may use any suitable technique (such as those described above) to select on or more entries from the identified unused entries to invalidate.

Method 800 further proceeds at block 830 by using the least-recently-used rename value to identify cached entries in the TLB circuit. As illustrated, invalidate daemon 550 may, prior to evicting selected entries to be invalidated, use the rename values associated with the selected entries to identify any TLB entries 425 that are tagged with these rename values. Since the rename values are about to be evicted, any TLB entries associated with these rename values are also evicted.

At block 840, method 800 continues by, invalidating the identified cached entries in the TLB circuit. After the TLB entries 425 that are tagged with the selected rename values have been evicted, the selected rename value entries in ASID rename values 410 and/or VMID rename values 415 are evicted. Once the entries are evicted, the locations in the tables may be used for rename values for newly received context identifiers.

It is noted that method 800 includes blocks 810-840. Method 800 may end in block 840 or may repeat some or all blocks of the method. For example, method 800 may return to block 810 in response to a subsequent indication of the number of allocated entries satisfying the threshold value. In a manner as described above for method 700, method 800 may be performed concurrently with other instantiations of itself and/or method 700. For example, an instance of method 700 may be performed in response to an indication of a context change while an instance of method 800 is performed to evict one or more entries in the rename tables to free entries for a received context identifier.

Figure 9:
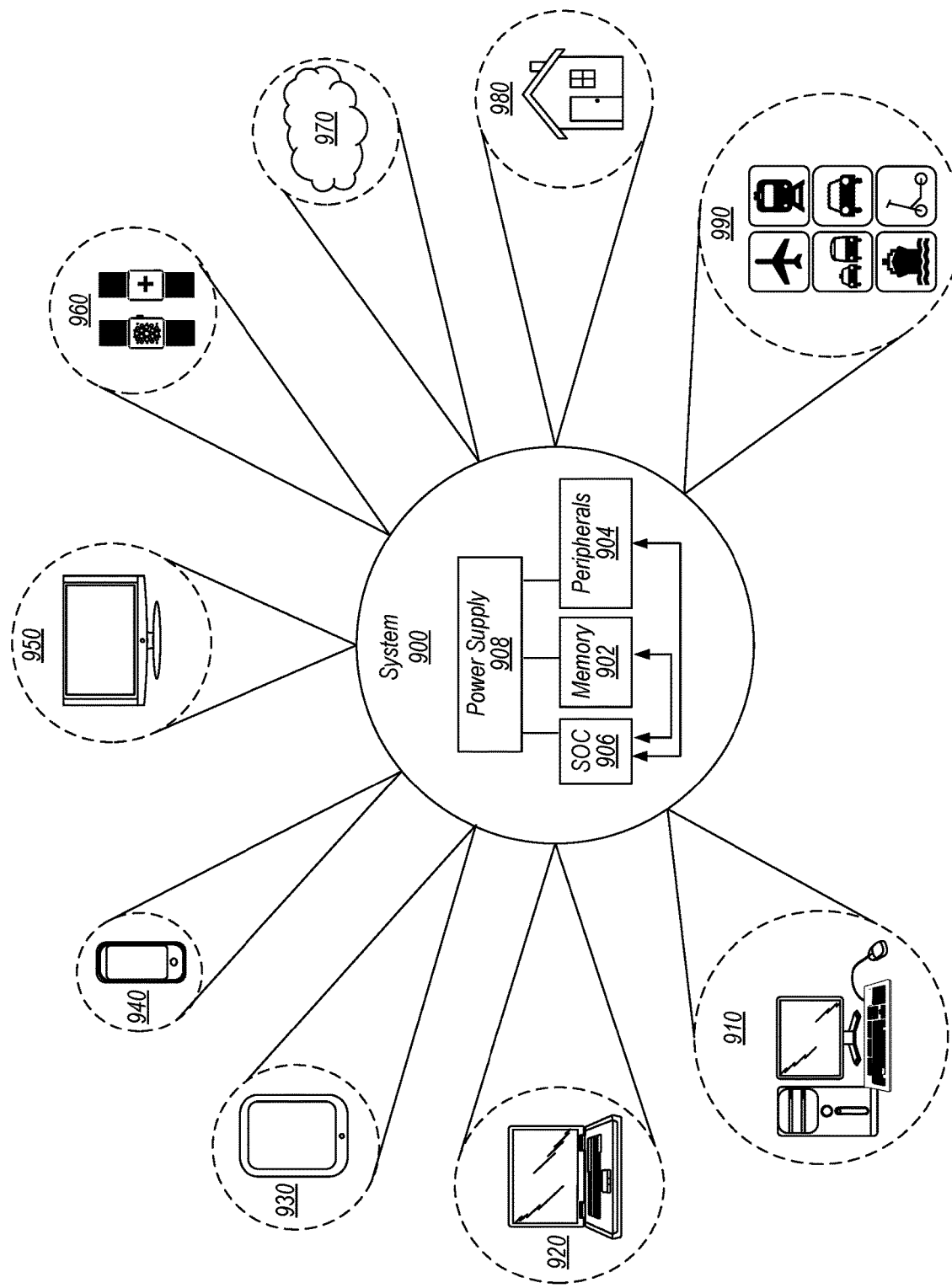
FIG. 9 depicts various embodiments of systems that include integrated circuits that utilize the disclosed techniques.

FIGS. 1-8 illustrate circuits and methods for a system, such as an integrated circuit, that includes a context identification circuit in the integrated circuit. Any embodiment of the disclosed systems may be included in one or more of a variety of computer systems, such as a desktop computer, laptop computer, smartphone, tablet, wearable device, and the like. In some embodiments, the circuits and methods described above may be implemented on a system-on-chip (SoC) or other type of integrated circuit. A block diagram illustrating an embodiment of computer system 900 is illustrated in FIG. 9. SoC 906 may, in some embodiments, include any disclosed embodiment of systems 100-600 in FIGS. 1-6.

In the illustrated embodiment, the system 900 includes at least one instance of a system on chip (SoC) 906 which may include multiple types of processor circuits, such as a central processing unit (CPU), a graphics processing unit (GPU), or otherwise, a communication fabric, and interfaces to memories and input/output devices. One or more of these processor circuits may correspond to an instance of the processor cores disclosed herein. In various embodiments, SoC 906 is coupled to external memory circuit 902, peripherals 904, and power supply 908.

A power supply 908 is also provided which supplies the supply voltages to SoC 906 as well as one or more supply voltages to external memory circuit 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory circuit 902 is included as well).

External memory circuit 902 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 902 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 960 are contemplated as well, such as devices worn around the neck, devices attached to hats or other headgear, devices that are implantable in the human body, eyeglasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home 980 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 900 to various modes of transportation 990. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise.

It is noted that the wide variety of potential applications for system 900 may include a variety of performance, cost, and power consumption requirements. Accordingly, a scalable solution enabling use of one or more integrated circuits to provide a suitable combination of performance, cost, and power consumption may be beneficial. These and other embodiments are possible and are contemplated. It is noted that the devices and applications illustrated in FIG. 9 are illustrative only and are not intended to be limiting. Other devices are possible and are contemplated.

As disclosed in regards to FIG. 9, computer system 900 may include one or more integrated circuits included within a personal computer, smart phone, tablet computer, or other type of computing device. A process for designing and producing an integrated circuit using design information is presented below in FIG. 10.

Figure 10:
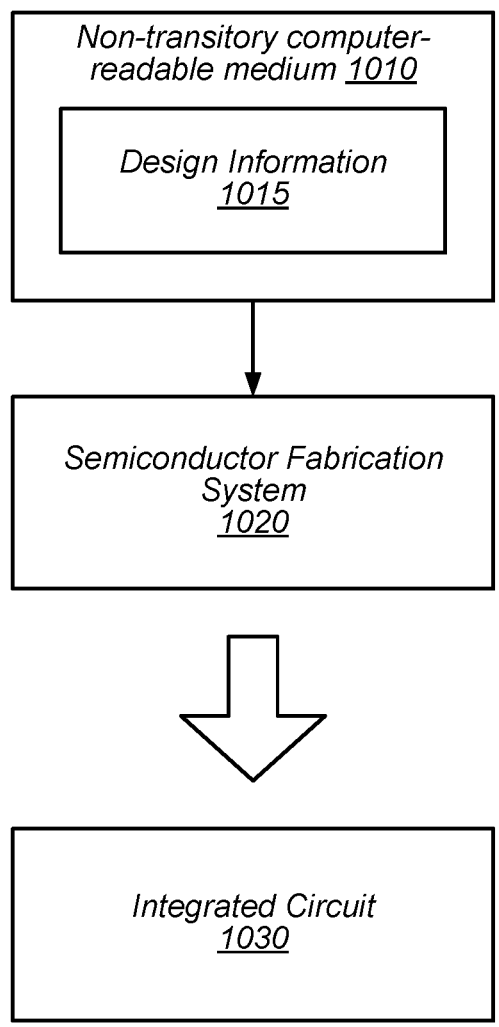
FIG. 10 is a block diagram of an example computer-readable medium, according to some embodiments.

FIG. 10 is a block diagram illustrating an example of a non-transitory computer-readable storage medium that stores circuit design information, according to some embodiments. The embodiment of FIG. 10 may be utilized in a process to design and manufacture integrated circuits, for example, including one or more instances of systems 100-600 shown in FIGS. 1-6. In the illustrated embodiment, semiconductor fabrication system 1020 is configured to process the design information 1015 stored on non-transitory computer-readable storage medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus comprising:
   a context identification circuit configured to:
      receive a context identifier assigned to a process being executed by a processor; and
      assign, in a given one of a plurality of rename entries, a rename value to the context identifier that has fewer bits than the context identifier; and
   a translation lookaside buffer (TLB) circuit coupled to the context identification circuit, wherein the translation lookaside buffer is configured to:
      receive a translation request for a particular virtual address that is associated with the process;
      cache, in a given TLB entry of the TLB circuit, a translation of the particular virtual address to a corresponding physical address, wherein the given TLB entry is tagged with a portion of the particular virtual address and the rename value; and
      in response to a subsequent translation request for the particular virtual address, detect, using both the portion of the particular virtual address and the rename value, a hit on the given TLB entry of the TLB circuit; and
   wherein the context identification circuit is further configured to:
      in response to the detected hit on the given TLB entry of the TLB circuit, set a used indicator associated with the given rename entry;
      after a determination that a threshold number of a plurality of rename values have been assigned, scan the TLB circuit for rename values; and
      update used indicators for the plurality of rename entries based on the scan.

2. The apparatus of claim 1, wherein the context identification circuit is further configured to:
   in response to the subsequent translation request for the particular virtual address, use the context identifier to provide the TLB circuit with the rename value.

3. The apparatus of claim 1, wherein the context identification circuit is further configured to receive a given context identifier in response to a change in a process being executed by the processor.

4. The apparatus of claim 1, wherein the context identification circuit is further configured to:
   in response to receiving a different context identifier, identify an available one of the plurality of rename entries; and
   in response to a determination that there are no available rename entries, invalidate a selected rename entry of the plurality of rename entries.

5. The apparatus of claim 4, wherein to invalidate the selected rename entry, the context identification circuit is further configured to:
   identify a least-recently-used rename entry;
   use a corresponding rename value from the least-recently-used rename entry to identify cached entries in the TLB circuit; and
   invalidate the identified cached entries in the TLB circuit.

6. The apparatus of claim 1, wherein the context identification circuit is further configured to:
   based on the determination that the threshold number of the plurality of rename entries have been assigned, select one or more of the plurality of rename entries based on the updated used indicators; and
   invalidate the selected one or more rename entries of the plurality of rename entries.

7. The apparatus of claim 6, wherein the context identification circuit is further configured to:
   use a daemon to invalidate the selected one or more rename entries; and
   process a given received context identifier concurrently with the daemon.

8. The apparatus of claim 7, wherein the context identification circuit is further configured to:
   receive, while invalidating the selected one or more rename entries, a translation request for a given process corresponding to one of the selected one or more rename entries; and
   continue to invalidate the corresponding rename entry.

9. The apparatus of claim 1, wherein the context identification circuit is further configured to:
   search, using a context identifier included in the subsequent translation request, the plurality of rename entries for the rename value; and
   use the rename value and the portion of the particular virtual address as an index into the TLB circuit.

10. A method, comprising:
    generating, by a context identification circuit for a particular context identifier associated with a particular process being executed by a processor, a particular rename value that has fewer bits than the particular context identifier;
    storing, by the context identification circuit, the particular rename value in a particular location of a plurality of locations in a rename value table;
    receiving, by a translation lookaside buffer (TLB) circuit, a translation request for a particular virtual address that is associated with the particular process;
    accessing, by the TLB circuit using the particular virtual address and the particular rename value, cached entries of the TLB circuit;
    in response to identifying a particular cached entry associated with the particular virtual address and the particular rename value, using a corresponding physical address translation stored in the particular cached entry to complete the translation request;
    in response to using the particular rename value, set a used indicator associated with the particular location in the rename value table; and
    after determining that a threshold number of a plurality of rename values have been stored in the rename value table, update used indicators for the plurality of locations in the rename value table.

11. The method of claim 10, further comprising:
    based on the determining that the threshold number of the plurality of rename values have been stored in the rename value table, select one or more of the plurality of locations based on the updated used indicators; and
    invalidate the selected one or more locations of the plurality of locations in the rename value table.

12. The method of claim 10, further comprising:
in response to receiving the translation request for the particular virtual address, using information from the translation request to identify the particular location in the rename value table.

13. The method of claim 10, further comprising:
in response to an indication of a different process being executed by the processor, generating a different rename value; and
storing the different rename value in a different location of the plurality of locations in the rename value table.

14. The method of claim 13, wherein storing the different rename value in the different location includes:
determining that all of the plurality of locations are unavailable;
invalidating a least-recently-used location of the plurality of locations; and
storing the different rename value in the invalidated least-recently-used location.

15. The method of claim 14, further comprising stalling the processor during the invalidation of the least-recently-used location.

16. A system, comprising:
a processor complex configured to execute instructions for a plurality of processes across a plurality of virtual machines;
a context identification circuit configured to:
in response to receiving an address space identifier (ASID) associated with a particular process being executed in the processor complex, generate an ASID rename value that has fewer bits than the ASID;
in response to receiving a virtual machine identifier (VMID) associated with the particular process, generate a VMID rename value that has fewer bits than the VMID;
store the ASID rename value and the VMID rename value into respective rename table entries of a plurality of rename table entries of a rename table; and
a translation lookaside buffer (TLB) circuit configured to:
receive a translation request for a particular virtual address that is associated with the particular process; and
use the particular virtual address, the ASID rename value, and the VMID rename value, to access cached entries of the TLB circuit; and wherein the context identification circuit is further configured to:
in response to using the ASID and VMID rename values, set a corresponding used indicator associated with the respective rename table entries; and
after determining that a threshold number of a plurality of ASID rename values have been stored in the rename table, update used indicators for ones of the plurality of rename table entries that store ASID rename values.

17. The system of claim 16, wherein the TLB circuit is further configured to:
in response to a determination that a particular cached entry in the TLB circuit is associated with the particular virtual address, the ASID rename value, and the VMID rename value, use a physical address translation stored in the particular cached entry to complete the translation request.

18. The system of claim 16, wherein the TLB circuit is further configured to:
in response to a determination that a single cached entry in the TLB circuit is not associated with the particular virtual address, the ASID rename value, and the VMID rename value, cache, in an available entry of the TLB circuit, a translation of the particular virtual address to a corresponding physical address, wherein the available entry is tagged with the ASID rename value and the VMID rename value.

19. The system of claim 16,
wherein the context identification circuit is further configured to:
store the ASID rename value in an available one of a first set of locations; and
store the VMID rename value in an available one of a second set of locations.

20. The system of claim 19, wherein the context identification circuit is further configured to:
receive the translation request for the particular virtual address that is associated with the particular process;
extract the ASID and VMID from the translation request;
use the ASID to identify the ASID rename value in the first set of locations; and
use the VMID to identify the VMID rename value in the second set of locations.

* * * * *